(12) United States Patent
Homer

(10) Patent No.: US 7,928,966 B2
(45) Date of Patent: Apr. 19, 2011

(54) COMPUTER INPUT PEN APPARATUS

(75) Inventor: Steven S. Homer, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2008 days.

(21) Appl. No.: 10/814,538

(22) Filed: Mar. 31, 2004

(65) Prior Publication Data

US 2005/0219233 A1   Oct. 6, 2005

(51) Int. Cl.
*G06F 3/033* (2006.01)

(52) U.S. Cl. ............... 345/179; 345/180; 178/19.01

(58) Field of Classification Search ............ 345/179, 345/180; 401/131, 195; 178/19.01–19.07
See application file for complete search history.

(56) References Cited

U.S. PATENT DOCUMENTS

| | | |
|---|---|---|
| 4,127,338 A | 11/1978 | Laybourne |
| 5,371,516 A | 12/1994 | Toyoda et al. |
| 5,454,654 A | 10/1995 | Bergstrom |
| 5,530,208 A | 6/1996 | Moriconi et al. |
| 5,657,459 A | 8/1997 | Yanagisawa et al. |
| 5,898,427 A | 4/1999 | Okamoto |
| 6,215,480 B1 * | 4/2001 | Danis et al. .............. 345/179 |
| 2005/0088425 A1 * | 4/2005 | Sun .......................... 345/179 |

FOREIGN PATENT DOCUMENTS

JP    6072087    3/1994

OTHER PUBLICATIONS

JP Official Action dated Dec. 5, 2006, Appln No. P2005-072629, pp. 2.

* cited by examiner

*Primary Examiner* — Bipin Shalwala
*Assistant Examiner* — Steven E Holton

(57) ABSTRACT

A computer input pen comprises a cylindrical housing and a weight eccentrically disposed within the cylindrical housing relative to a longitudinal axis of the cylindrical housing. The weight is rotationally coupled relative to the cylindrical housing with a desired level of friction to absorb rotational energy of the cylindrical housing relative to the weight.

15 Claims, 3 Drawing Sheets

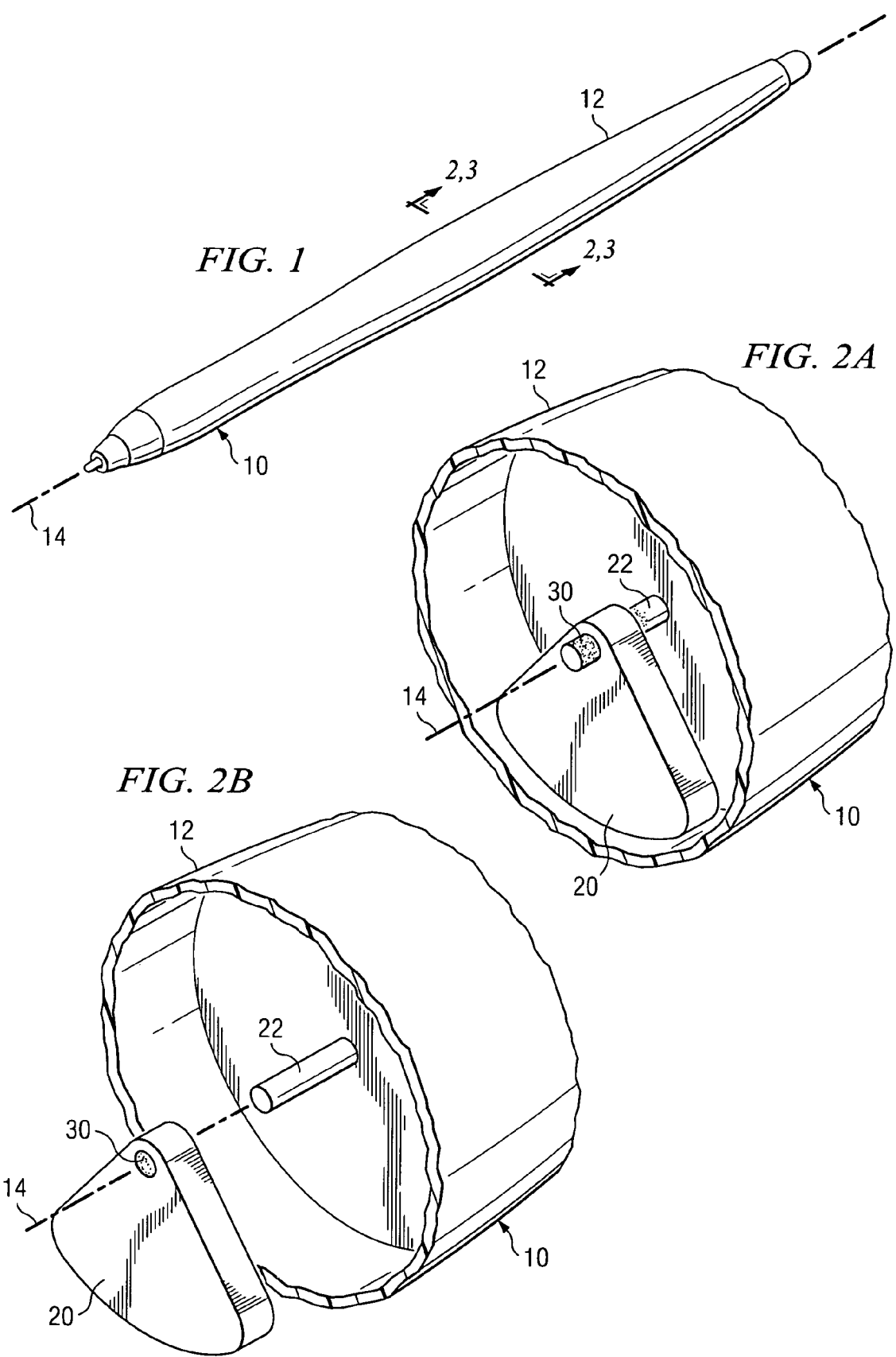

COMPUTER INPUT PEN APPARATUS

BACKGROUND

Computer input devices, such as an input pen and/or stylus, are generally used for input operations associated with electronic apparatuses such as personal digital assistants and other types of handheld electronic devices, notebook computers, tablet personal computers, and electronic whiteboard devices. The input pen is generally formed having a cylindrical shape to enable convenient storage of the pen within a pen storage area or compartment associated with the electronic device. However, because of the cylindrical shape of the pen, the pen easily rolls off a desk or other type of working surface. A weight may be disposed within the pen to provide an offset center of gravity for the pen to reduce pen rolling. However, if the user places the input pen onto a slanted or sloped working surface or places the input pen onto a working surface at a roll, the weight within the pen generally results in a momentum source that causes continued rolling of the pen.

SUMMARY OF THE INVENTION

In accordance with one embodiment of the present invention, a computer input pen comprises a cylindrical housing and a weight eccentrically disposed within the cylindrical housing relative to a longitudinal axis of the cylindrical housing. The weight is rotationally coupled relative to the cylindrical housing with a desired level of friction to absorb rotational energy of the cylindrical housing relative to the weight.

In accordance with one embodiment of the present invention, computer input pen comprises a cylindrical housing and a weight eccentrically disposed within the cylindrical housing relative to a longitudinal axis of the cylindrical housing. The weight is also moveably disposed within the cylindrical housing. The computer input pen also comprises a frictional element adapted to inhibit movement between the weight and the cylindrical housing.

BRIEF DESCRIPTION OF THE DRAWINGS

For a more complete understanding of the present invention and the advantages thereof, reference is now made to the following descriptions taken in connection with the accompanying drawings in which:

FIG. 1 is a diagram illustrating an embodiment of a computer input pen in accordance with the present invention;

FIGS. 2A-2D are cross-sectional diagrams illustrating embodiments of the computer input pen of FIG. 1 taken along the line 2-2 of FIG. 1.

DETAILED DESCRIPTION OF THE DRAWINGS

Figure 2C:
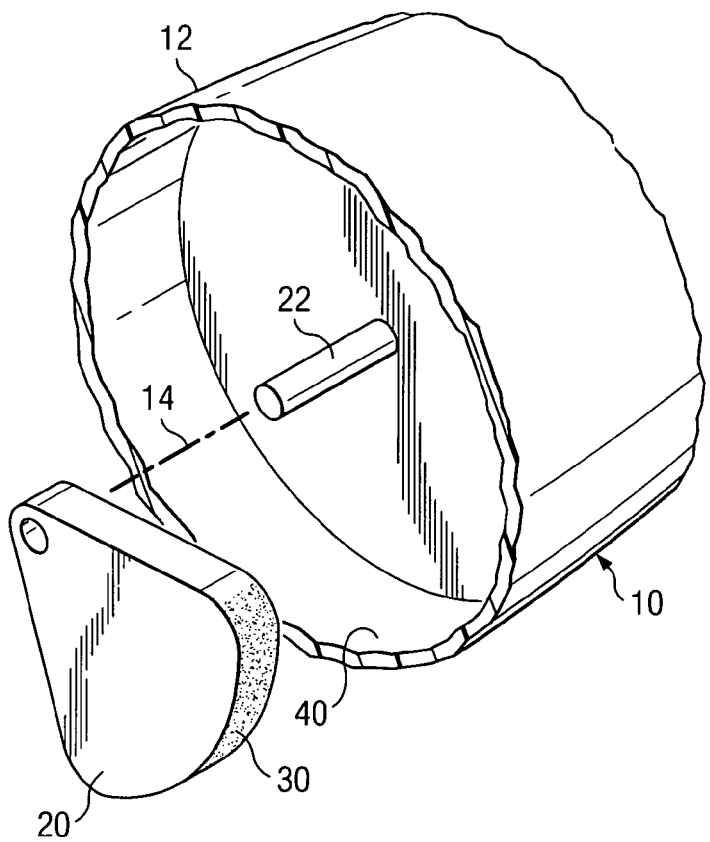

The preferred embodiments of the present invention and the advantages thereof are best understood by referring to FIGS. 1-3 of the drawings, like numerals being used for like and corresponding parts of the various drawings.

FIG. 1 is a diagram illustrating an embodiment of a computer input pen 10 in accordance with the present invention. Computer input pen 10 may comprise any pen-type device for performing an input operation associated with a variety of different types of electronic apparatuses such as, but not limited to, personal digital assistants and other types of handheld electronic devices, notebook computers, tablet personal computers, and electronic white board devices. In the embodiment illustrated in FIG. 1, computer input pen 10 comprises a generally cylindrical housing 12 having a longitudinal axis 14 extending centrally therethrough. Briefly, embodiments of the present invention inhibit or substantially prevent rolling of computer input pen 10 while enabling convenient storage of computer input pen 10 in a storage area or compartment of an electronic apparatus based on its cylindrical shape.

FIGS. 2A through 2D are cross-sectional diagrams illustrating embodiments of computer input pen 10 taken along the line 2-2 of FIG. 1. Referring to FIGS. 2A through 2D, computer input pen 10 comprises a weight 20 eccentrically disposed relative to axis 14 of computer input pen 10. Weight 20 may comprise any type of geometric configuration such that a center of gravity of weight 20 is offset from axis 14 of computer input pen 10. Briefly, weight 20 is movably disposed within housing 12 of pen 10 having a desired or predetermined level of friction between weight 20 and a corresponding portion of pen 10 to inhibit or substantially prevent rolling of pen 10 by absorbing or otherwise dissipating energy resulting from movement between weight 20 and a corresponding portion of pen 10.

In the embodiment illustrated in FIGS. 2A through 2D, weight 20 is rotatably coupled to a shaft 22 disposed substantially coincident with axis 14. However, it should be understood that weight 20 may be otherwise coupled or disposed within housing 12 to enable movement of weight 20 relative to housing 12. In the embodiment illustrated in FIGS. 2A and 2B, a desired or predetermined level of friction is provided between shaft 22 and weight 20 to absorb or dissipate rotational energy between weight 20 and shaft 22 resulting from rotational movement of weight 20 relative to shaft 22. For example, in the embodiment illustrated in FIG. 2A, a frictional element 30 is disposed on a surface of shaft 22 facing or otherwise in engagement with a corresponding surface of weight 20 such that rotational energy between weight 20 and shaft 22 is absorbed by frictional element 30, thereby inhibiting or substantially preventing rolling of computer input pen 10. Frictional element 30 may comprise an integrally formed frictional surface of a component of pen 10, such as, but not limited to, an abraded or knurled surface of a desired component of pen 10. Frictional element 30 may also comprise a separate element adhered or otherwise affixed to a desired component of pen 10 such as, but not limited to, a frictional material adhesively secured to a desired component of pen 10.

In the embodiment illustrated in FIG. 2B, frictional element is disposed on a surface of weight 20 facing or otherwise in engagement with a corresponding surface of shaft 22 to absorb rotational energy between weight 20 and shaft 22. In the embodiments illustrated in FIGS. 2A and 2B, frictional element 30 is disposed on either shaft 22 or weight 20. However, it should be understood that frictional element 30 may also be disposed on both shaft 22 and weight 20. Thus, in operation, frictional element 30 provides a desired level of friction between corresponding moving surfaces of weight 20 and shaft 22 such that rotational energy between weight 20 and shaft 22 resulting from any rolling movement of pen 10 is absorbed by frictional element 30.

Figure 2D:
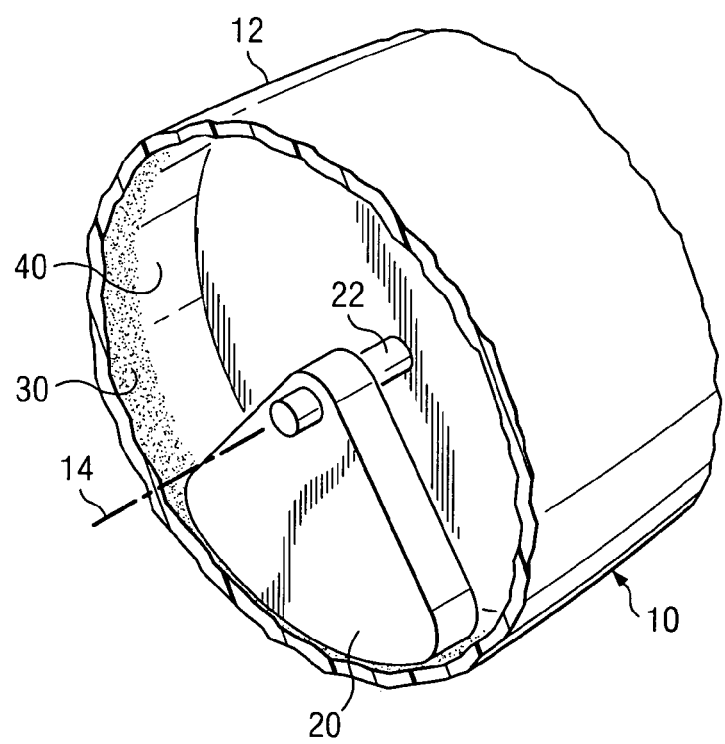

In the embodiment illustrated in FIG. 2C, frictional element 30 is disposed along a surface of weight 20 facing or otherwise in engagement with an interior surface 40 of housing 12. For example, in the embodiment illustrated in FIG. 2C, rotational energy of weight 20 relative to housing 12 is absorbed by frictional element 30 as weight 20 rotates within housing 12 relative to interior surface 40 of housing 12. Alternatively, or additionally, frictional element 30 may also be disposed on interior surface 40 of housing 12 as illustrated in the embodiment of FIG. 2D. Thus, in the embodiments illustrated in FIGS. 2C and 2D, frictional element 30 is disposed on engagement surfaces of weight 20 and/or interior surface 40 of housing 12 to absorb rotational energy between weight 20 and interior surface 40 of housing 12 resulting from any rolling movement of pen 10. As described above, frictional element 30 may be integrally formed on weight 20 and/or interior surface 40 of housing 12. Frictional element 30 may also comprise a separate element affixed or otherwise coupled to surfaces of weight 20 and/or interior surface 40 of housing 12. Further, it should be understood that frictional element 30 may be disposed on a surface of weight 20, a surface of shaft 22, and/or interior surface 40 of housing 12, or any combination thereof. It should also be understood that frictional element 30 may be disposed on other surfaces of weight 20 and/or other surfaces of pen 10 contacting or otherwise in engagement with weight 20 to absorb or otherwise dissipate energy resulting from movement of weight 20 relative to another surface of pen 10.

Figure 3A:
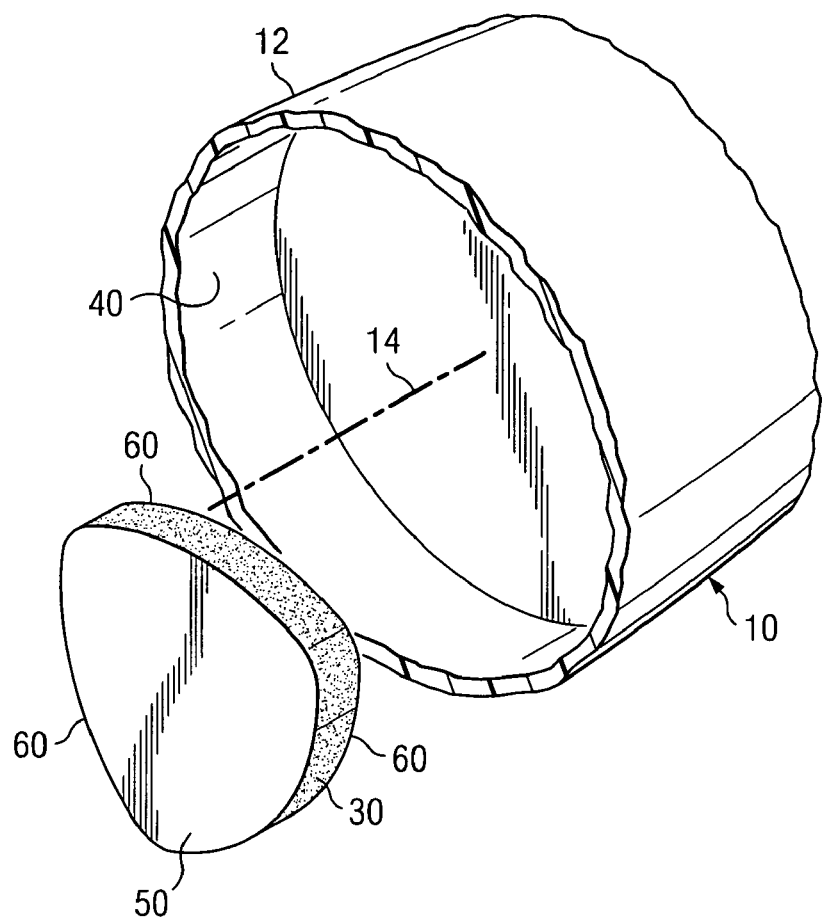
FIGS. 3A-3B are cross-sectional diagrams illustrating additional embodiments of the computer input pen of FIG. 1 taken along the line 3-3 of FIG. 1.
Figure 3B:
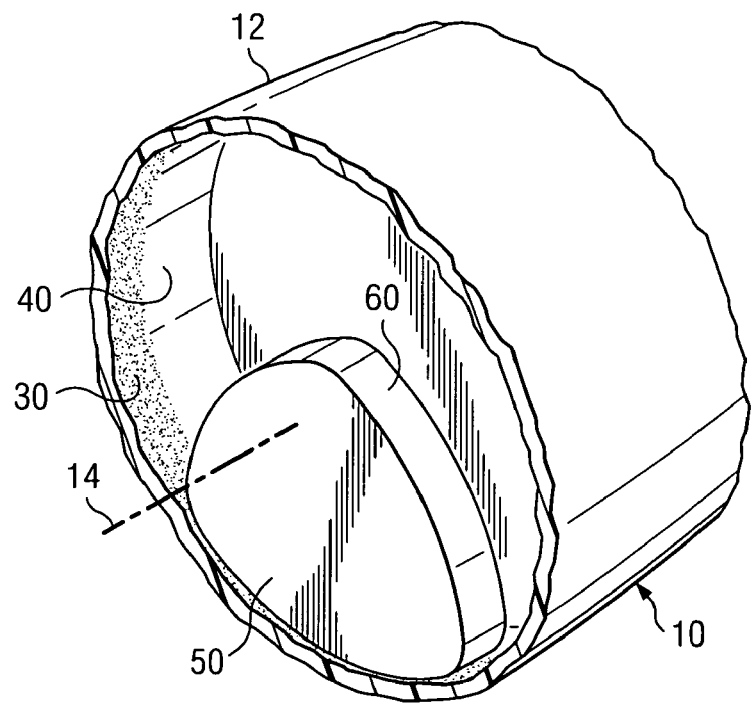

In the embodiment illustrated in FIGS. 3A and 3B, a weight 50 is movably disposed within housing 12 such that a center of gravity of weight 50 is offset from axis 14. In the embodiment illustrated in FIG. 3A, frictional element 30 is disposed on a surface of weight 50 facing or otherwise in engagement with interior surface 40 of housing 12 to absorb rotational energy between weight 50 and interior surface 40 of housing 12 resulting from any rolling of pen 10. Additionally, or alternatively, frictional element 30 may be disposed on interior surface 40 of housing 12 as best illustrated in the embodiment of FIG. 3B. In the embodiments illustrated in FIGS. 3A and 3B, weight 50 is preferably formed having a geometry to provide an offset center of gravity relative to axis 14 of pen 10 while enabling energy dissipation relative to weight 50 resulting from rolling movement of pen 10. For example, in the embodiments illustrated in FIGS. 3A and 3B, weight 50 is formed having arcuately formed peripheral surfaces 60 to enable engagement of any of surfaces 60 with interior surface 40 of housing 12. However, it should be understood that other geometric configurations of weight 50 may also be used.

Thus, in operation, a desired level of friction is provided relative to weight 20,50 such that, if computer input pen 10 is rolling on a particular working surface, the rotational energy between weight 20,50 and a corresponding portion of computer input pen 10 is absorbed or otherwise dissipated by frictional element 30, thereby inhibiting or substantially preventing continued rolling of computer input pen 10.

What is claimed is:

1. A computer input pen, comprising:
   a cylindrical housing;
   a weight eccentrically disposed within the cylindrical housing relative to a longitudinal axis of the cylindrical housing, the weight rotationally coupled relative to the cylindrical housing with a desired level of friction to absorb rotational energy of the cylindrical housing relative to the weight; and
   a frictional element disposed on a surface of the weight.

2. The computer input pen of claim 1, wherein the weight is rotationally coupled to a shaft extending along the longitudinal axis.

3. A computer input pen, comprising:
   a cylindrical housing;
   a weight eccentrically disposed within the cylindrical housing relative to a longitudinal axis of the cylindrical housing, the weight rotationally coupled relative to the cylindrical housing with a desired level of friction to absorb rotational energy of the cylindrical housing relative to the weight; and
   a frictional element disposed on an interior surface of the cylindrical housing.

4. A computer input pen, comprising:
   a cylindrical housing;
   a weight eccentrically disposed within the cylindrical housing relative to a longitudinal axis of the cylindrical housing, the weight moveably disposed within the cylindrical housing; and
   a frictional element adapted to inhibit movement between the weight and the cylindrical housing.

5. The computer input pen of claim 4, wherein the frictional element is disposed on an interior surface of the cylindrical housing.

6. The computer input pen of claim 4, wherein the frictional element is disposed on a surface of the weight.

7. The computer input pen of claim 4, wherein the frictional element comprises an integrally formed surface of the weight.

8. The computer input pen of claim 4, wherein the frictional element comprises an integrally formed interior surface of the cylindrical housing.

9. The computer input pen of claim 4, wherein the frictional element is disposed between a shaft disposed along the longitudinal axis of the cylindrical housing and the weight.

10. The computer input pen of claim 9, wherein the frictional element comprises an integrally formed surface of the shaft.

11. The computer input pen of claim 9, wherein the frictional element comprises an integrally formed surface of the weight.

12. A computer input pen, comprising:
    means for moveably and eccentrically disposing a weight within a cylindrical housing; and;
    means for providing a desired level of friction to absorb energy resulting from movement between the weight and the cylindrical housing, wherein the friction means comprises means formed on a shaft disposed along a longitudinal axis of the cylindrical housing and adapted to engage a corresponding surface of the weight.

13. The computer input pen of claim 12, wherein the disposing means comprises means for rotationally disposing the weight within the cylindrical housing.

14. A computer input pen, comprising:
    means for moveably and eccentrically disposing a weight within a cylindrical housing; and;
    means for providing a desired level of friction to absorb energy resulting from movement between the weight and the cylindrical housing, wherein the friction means comprises means integrally formed on a surface of the weight.

15. A computer input pen, comprising:
    means for moveably and eccentrically disposing a weight within a cylindrical housing; and;
    means for providing a desired level of friction to absorb energy resulting from movement between the weight and the cylindrical housing, wherein the friction means comprises means integrally formed on an interior surface of the cylindrical housing.

* * * * *